US007260542B1

(12) United States Patent
Yu et al.

(10) Patent No.: US 7,260,542 B1
(45) Date of Patent: Aug. 21, 2007

(54) METHOD AND SYSTEM FOR THE REAL TIME SALE OF SENSOR DATA

(75) Inventors: Philip Shi-Lung Yu, Chappaqua, NY (US); Stephen J. Boies, Mahopac, NY (US); Sam Dinkin, Austin, TX (US); Paul Andrew Moskowitz, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/565,005

(22) Filed: May 4, 2000

(51) Int. Cl.
*G06Q 10/00* (2006.01)

(52) U.S. Cl. ............................................ 705/1; 705/26

(58) Field of Classification Search ..................... None
See application file for complete search history.

(56) References Cited

U.S. PATENT DOCUMENTS 5,831,527 A * 11/1998 Jones, II et al. ............ 340/540
5,943,046 A * 8/1999 Cave et al. ................. 345/327
6,253,064 B1 * 6/2001 Monroe ....................... 455/66
6,545,601 B1 * 4/2003 Monroe ...................... 340/521
6,628,325 B1 * 9/2003 Steinberg et al. ........ 348/211.1

FOREIGN PATENT DOCUMENTS

WO WO96/36181 * 11/1996

* cited by examiner

*Primary Examiner*—John G. Weiss
*Assistant Examiner*—Michael Fisher
(74) *Attorney, Agent, or Firm*—Buckley, Maschoff & Talwalkar LLC; Stephen C. Kaufman

(57) ABSTRACT

A method and system for the transmission and sale of real-time sensor data. The system including, placing remote sensors in areas of interest to the providers users, receiving sensor orientation requests from users, determining a winning sensor orientation, and finally sending the data from the sensor to the users.

33 Claims, 7 Drawing Sheets

Fig. 7
Bid Database
| 1000 User Id | 1001 Sensor Array Id | 1002 Requested Sensor Orientation | 1003 Offer | 1004 Payment Method |
|---|---|---|---|---|
| 00034 | Sensor A3 | Camera 35°, Zoom 150% | $ 4.50 | Credit Card, ### ### ##### |
| 08853 | Sensor G43 | Mic. Sensitivity 35% | $ 1.00 | Debit, ### ## |
| 50684 | Sensor A3 | Camera 20°, Zoom 100% | $ 2.50 | Credit Card, ### ### ##### |
| 45784 | Sensor A3 | Camera 35°, Zoom 100% | $ 1.25 | Token, ### ### ## |
| | | | | |
| | | | | |
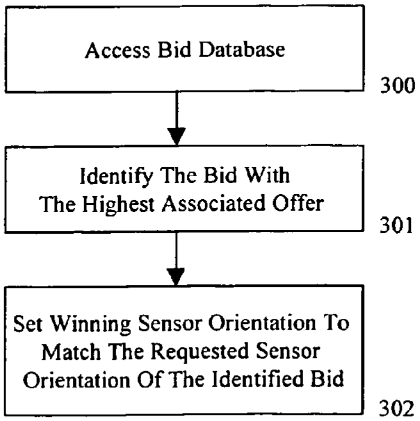
Fig. 8.A
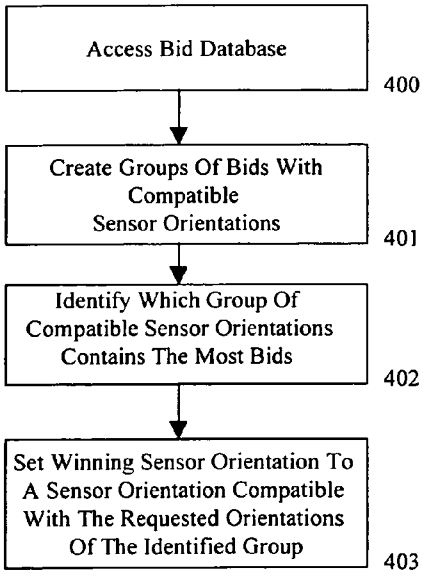
Fig. 8.B

Fig. 8.C

Return Maximizing Auction (sample)

| BIDDER | ORIENTATION REQUEST | OFFER |
|---|---|---|
| A | LEFT | $7.00 |
| B | LEFT | $1.00 |
| C | RIGHT | $5.00 |
| D | LEFT | $2.00 |
| E | RIGHT | $6.00 |
| WINNER | RIGHT | $11.00 TOTAL |

METHOD AND SYSTEM FOR THE REAL TIME SALE OF SENSOR DATA

TECHNICAL FIELD

The present system relates generally to the networked distribution of sensor data in real time, and more specifically to a method and system for auctioning the ability to control the orientation of the sensor in question thereby allowing the bidder an opportunity to receive the precise data they desire.

BACKGROUND

The Internet and other similar telecommunication technologies supply the infrastructure necessary for the creation of information services that provide very specific data for their users. "Web cams" represent one category of these services. Web cam sites provide cameras which deliver motion, or still, real time images from locations that would be of interest to their users. For example, web cams have been positioned to overlook beaches popular with surfers allowing them to check the waves before going to the beach. Similarly, other cameras are positioned overlooking highways allowing commuters to check traffic along their route.

These simple web cams tend to be limited to fixed locations and views. Therefore, some users may not receive exactly the information they desire. For example, a surfer using the web cam to check on waves may wish to zoom the camera in to check a wave's quality, or zoom out to see the overall size of a wave. This limitation has been addressed by giving users the ability to control the camera and direct it to exactly where they wish. This ability, however, creates problems allocating control of the camera. If many users wish to point the camera in different directions at the same time there must be some way to choose among the various requests. The problem has been addressed by letting the users control the camera on a first come first serve basis. This solution, however, is very simplistic and forces all the users to watch what ever the person currently controlling the camera wishes to see.

Another problem facing web cam providers, and other similar services, is how to receive a return on their investment. Most sites offering this type of real time data have either provided the service without an intention to profit from it, or used it as a method to draw users to their site. The sites that do use cams to generate income have attempted to do so through advertising, by selling memberships to use the site, or by charging an individual to control the cam for a period of time. These solutions, however, do not offer a very suitable way for selling this type of data. Advertising does not efficiently link the value of the service to the income received because advertisers and not the users are paying for the service. Furthermore, on sites of particularly local or individualized interest there may not be enough users to profit from the sale of advertising. Charging a membership fee is a better solution but this still does not address the problem of multiple users who wish to move the device in different directions at the same time. Letting one user control the camera at a time, and charging that user, solves the previous problem, but, limits the provider's return because only one user is charged when others may be willing to pay for the same information.

SUMMARY

A need exists for a system which allows for the control of real time sensor data, and a method of charging for it. In terms of control one needs a way to choose among a variety of requests so that a maximum number of users are satisfied with the new direction the camera is pointed. Similarly, with respect to charging for the information the provider would ideally seek to receive the maximum possible return.

The present system provides users with real time data feeds from sensors and allows users to choose and adjust the sensor so it provides the information most interesting to them. The system also allows sensor providers to sell this information. The above is accomplished by soliciting bids from users representing the adjustments the user would like to make to the sensor's orientation and an offer representing what the user is willing to pay if his bid is accepted.

In accordance with one aspect of the system, a sensor array is placed in a location where it can record data that may be interesting to potential users. The sensors used on the array and the areas the sensors can be directed to observe are nearly infinite. For example, the sensor array can consist of a simple camera positioned to overlook a highway and check on current traffic conditions. Or, the sensor array could be an orbiting satellite equipped with imaging sensors in the visual, infrared, and radar wavelengths, and listening sensors to intercept communications. The latter implementation would allow a user to not only choose which area of the planet will be observed, but also whether the visual, infrared, radar, or listening sensor will be used. The sensors could also be used in combination, for example the infrared sensor and the listening sensor might be used at the same time.

In accordance with another aspect of the system, a transaction control unit is in communication with at least one sensor array and the bidders who wish to use the available sensors. The transaction control unit then determines how the sensors on a sensor array are to be oriented at a particular time. This determination is made based on the requests received from the bidders. The requests will contain the sensor orientation that will provide the bidder with its desired data and an associated offer representing what the bidder is willing to pay to receive the data. With this information the transaction control unit can determine how to orient the sensors in accordance with various selection systems. For example, the transaction control unit can direct the sensor array to conform with the sensor orientation requested by the highest bidder. Alternatively, the transaction control unit can direct the sensor array to a sensor orientation that is compatible with the desired sensor orientations of more bids than another sensor orientation. Still further, the transaction control unit can direct the sensor array to a sensor orientation that is compatible with the desired sensor orientations of bids having an aggregate offer value greater than the aggregate offer value of any other set of compatible bids. These different systems can be used in any combination in order to accomplish different goals. For example, a sensor provider might choose a winning sensor orientation that will provide the most income. Or, the sensor provider might choose a winning sensor orientation which is not as financially lucrative but will satisfy a maximum number of users thereby popularizing the service.

BRIEF DESCRIPTION OF THE DRAWINGS

FIG. 7 is a chart showing one embodiment of the fields of the bid database.

FIGS. 8 A-C are flow charts embodying three different methods of selecting a sensor orientation.

DETAILED DESCRIPTION

Figure 1:
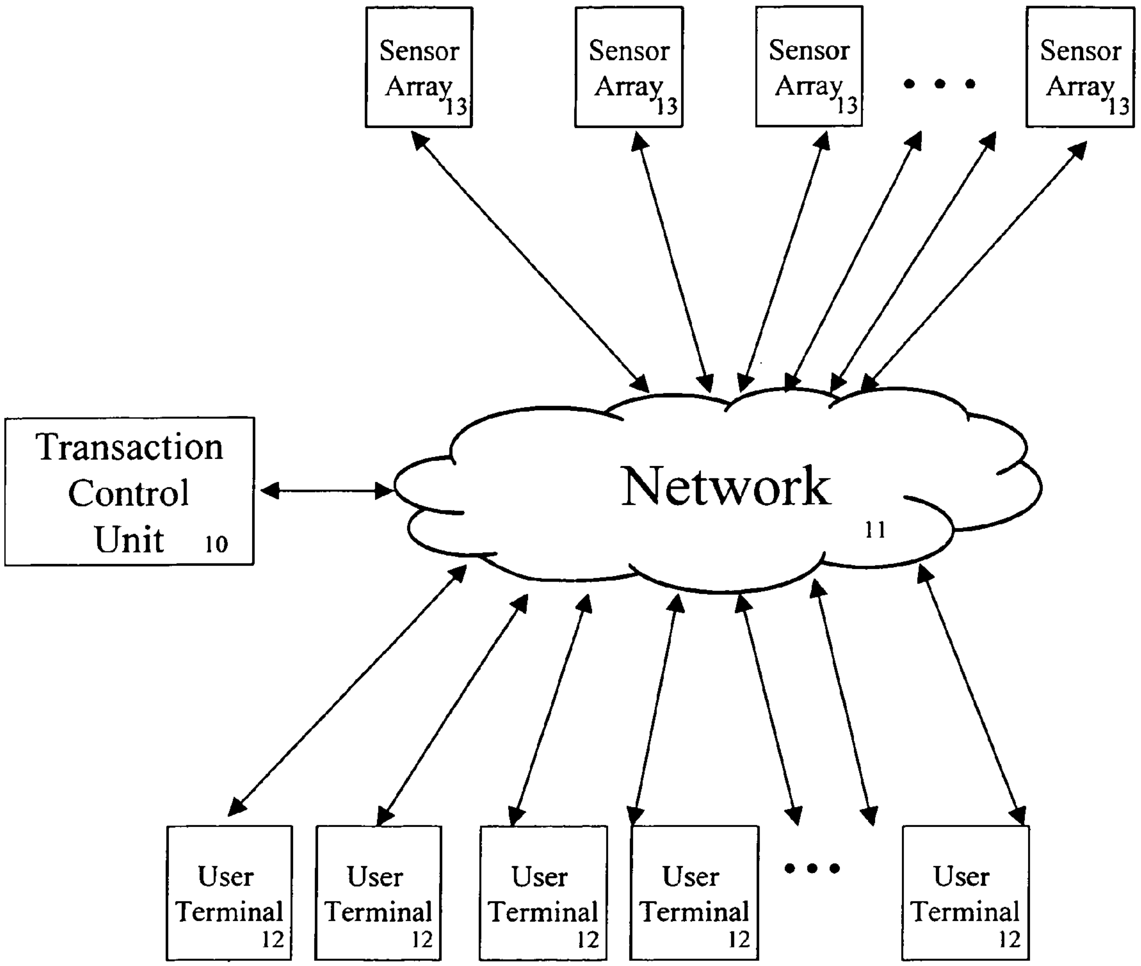
FIG. 1 is a block diagram showing the interconnection of the various elements of one embodiment of the system.

As discussed above the present system describes an efficient way to provide real-time sensor data. FIG. 1 is a high level block diagram representing an overview of one embodiment of the system. The diagram demonstrates the relationships between the various elements of the system.

FIG. 1 shows a transaction control unit 10, a number of user terminals 12, and a number of sensor arrays 13, connected to a network 11. The network 11 connecting the distinct elements of the system could represent any form of communications system, examples include a voice network, the internet, local area networks (LANs), or wide area networks (WANs). While in the depicted embodiment the elements of the system are all connected through the same network, this is not required. In an alternative embodiment the transaction control unit 10 could connect to the sensors directly. Or, the transaction control unit 10 could connect to the user terminals 12 via one network and to the sensor arrays 13 via another. For example, the user terminals 12 could communicate over the internet with transaction control unit 10, which in turn could communicate with sensors 13 via a WAN. In yet another embodiment of the system each sensor array could have its own integrated transaction control unit on board.

Figure 2:
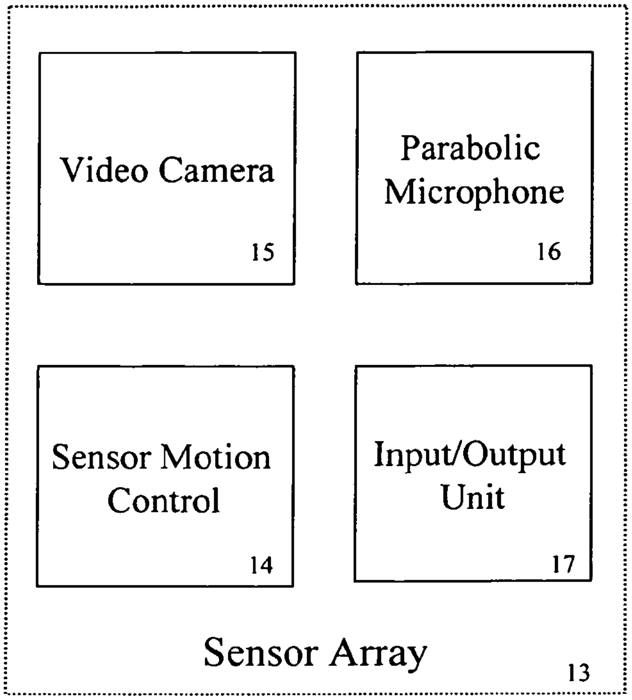
FIG. 2 is a block diagram of a sensor array of one embodiment of the system.

Any number of these sensor arrays 13 can be operated in conformance with this system, however for simplicity the system will be described in terms of one sensor array. The sensor array can contain any combination of different sensors. FIG. 2 depicts one possible embodiment of a sensor array in accordance with this system. This embodiment includes as its sensors a video camera 15 and a parabolic microphone 16.

The sensor array 13, with a compliment of appropriate sensors, is then positioned in a location from which it can observe events that would be interesting to the potential users. Examples of subject matter that would suit observation in accordance with the system are endless. Sensor arrays could be positioned by roads to provide traffic data. Sensor arrays could be placed in neighborhoods to allow homeowners to check the security of their homes. Sensor arrays can be placed at music, political, or sporting events. In the last example the relevant bidders may even be media companies interested in buying the content provided by the sensor provider rather than sending their own crew to cover the event. Sensor arrays could even be placed on satellites which can be used by scientists to observe the Earth. These sensor satellites could also give smaller nations the ability to gather tactical information about their neighbors without having to invest in their own observation satellites. The system could serve scientists if, for example, the sensor array was a telescope in the visual, or some other, light spectrum. This list is merely exemplary of the system's uses.

The sensor arrays are also intended to be able to alter the orientation of the sensors on the array, thereby allowing the users to position the sensors to obtain precisely the information about which they are most interested. Depending on the location and functionality of an individual sensor array, the user may be able to rotate, pan, and tilt the sensor array, or entirely change its location. Furthermore, the user may be able to adjust the individual sensors onboard the sensor array. For example adjusting the zoom of a camera, or adjusting the sensitivity of a microphone. The specific adjustments to a sensor array would depend entirely on the capabilities of the specific sensor array. Adjustments to a sensor array will take place via the sensor array's sensor motion control unit (14 in FIG. 2). The sensor orientation control 14 will respond to orientation commands and direct the sensor array 13 and the sensor array's onboard sensors (in FIG. 2 the video camera 15, and parabolic microphone 16) accordingly.

The sensor array will communicate via its input/output unit (17 in FIG. 2). The input/output unit 17 is responsible for receiving commands from the transaction control unit (10 in FIG. 1) and passing the commands to the sensor motion control 14, camera 15, and microphone 16. The input/output unit 17 then receives the data gathered by the sensors and transmits it. In accordance with alternative implementations of the system the input/output unit 17 can transmit the data to the transaction control unit 10 or to the user terminals 12.

Figure 3:
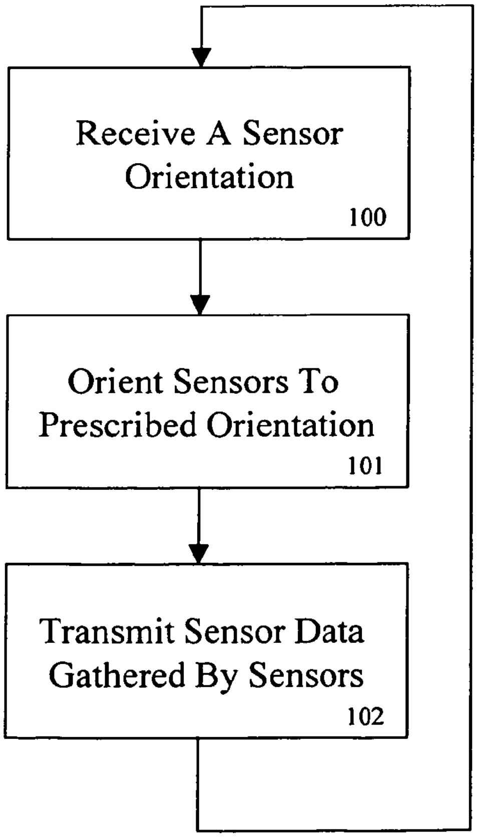
FIG. 3 is a flow chart demonstrating one embodiment of the sensor orientation process.

FIG. 3 depicts a flow chart describing the logical operation of the sensor array in accordance with the system. The input/output device 17 of the sensor array receives a transmission from the transaction control unit containing a sensor orientation, step 100. The sensor motion control then orients the sensor array and onboard sensors to the requested orientation, step 101. This step may include setting the individual sensors (e.g. the zoom of the camera or the sensitivity of the microphone). The sensor array then transmits the data gathered by the sensors, step 102.

The sensor motion control 14 and the input/output unit 17 can be implemented to control a sensor array in accordance with this system through any number of available techniques. For example, the sensor motion control and the input/output unit could both be implemented with programmed digital logic devices.

The users, or bidders, in accordance with the system will access the sensor data via a networked bidder unit 12, in FIG. 1. The device used implement the bidder unit 12 could be any device capable of receiving the data requested. In most instances this will be a computer. But, if the user was only requesting audio data, for example, a telephone could practice the system. Since a computer is the most flexible way of implementing the system, allowing the receipt of any kind of data, we will describe the system as implemented in a general purpose computer.

As noted above the first requirement is that the user computer be networked. The physical type of network, or the particular protocol used to transmit the data is unimportant to the system. The most obvious choice would be to allow the users to access the sensors and practice the system via the internet, through a web browser. The aspects of the system directed to the users will be described in accordance with this implementation.

First, the user will access a service containing information regarding the available sensor arrays via a web site. The service will describe the locations of various arrays and the areas they are capable of observing. In accordance with one alternative embodiment of the system the user would see on the site the data being transmitted from the current sensor orientation fbr the array. The web site will also describe the individual sensors on the array and the various adjustments that can be made to them. The user will then choose a sensor array, and a time, from which the user wishes to receive data. Next, the user sends a request, containing the adjustments that the user wishes to make to the array's sensors, an offer, an identifier, an e-mail address, and a payment method (see FIG. 7). Depending on the choice of the sensor provider the current state of the bids may be displayed, and the user may be allowed to substitute an increased bid to ensure it receives the data requested. Finally, the bidding is closed and data from the winning sensor orientation is transmitted.

The form of the final transmitted data can vary according to different aspects of the system. For example, the data might be transmitted to all those interested in viewing it. Or, the data might be sent to only the winning bidders. Service for the user might also be added by alerting the user whether it won or lost the auction, (i.e. whether the data requested will be displayed).

Figure 4:
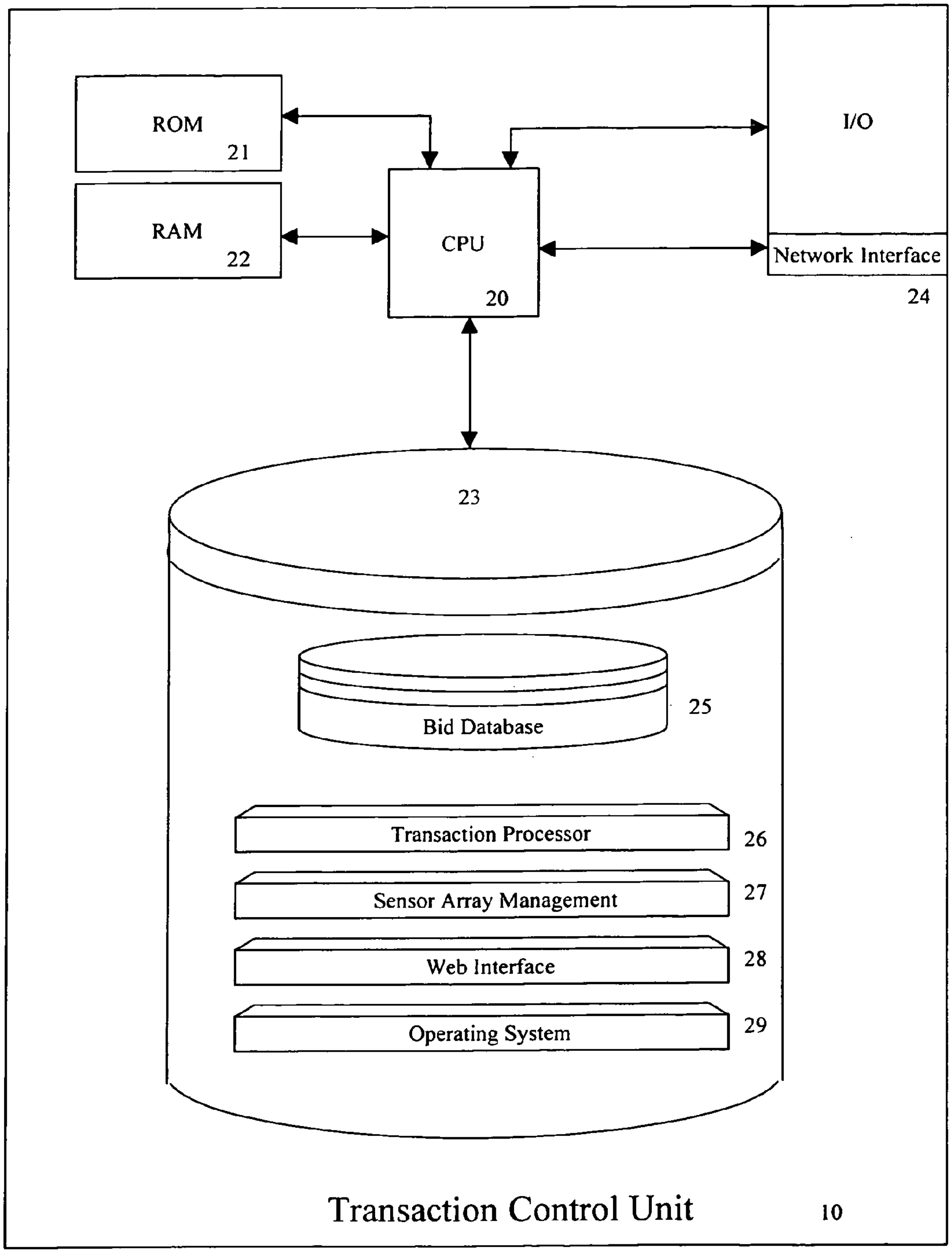
FIG. 4 is a diagram showing the embodiment of the transaction control unit in a single computer.
Figure 5:
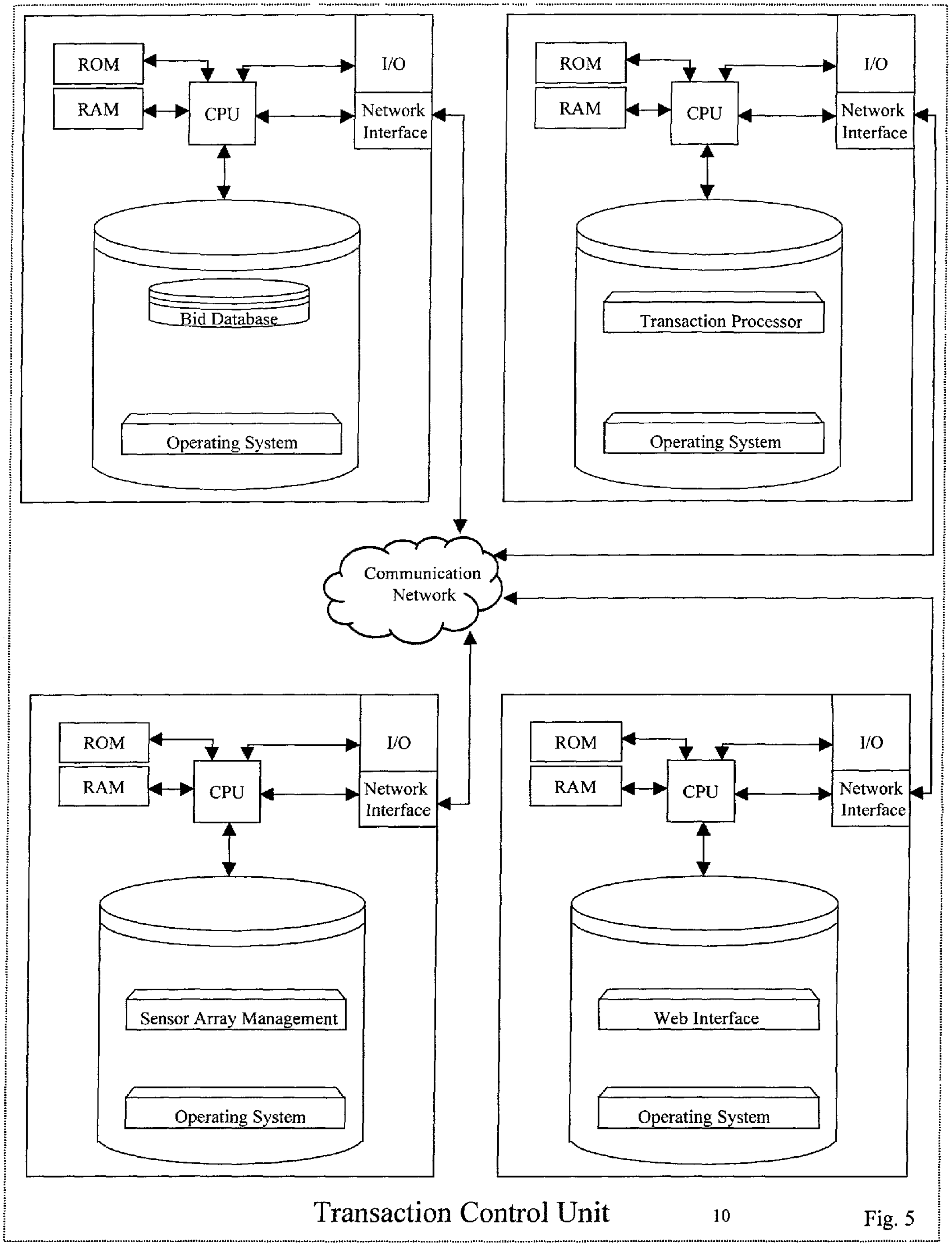
FIG. 5 is a diagram showing the embodiment of the transaction control unit in a number of computers.

The final element of the system is the transaction control unit 10, as shown in FIG. 1. This is the device that administers the requests, and commands the sensor arrays. As shown in FIG. 1 this device is in communication with the sensor arrays 13 and the user terminals 12. The transaction control unit's function is to accept bids from the bidders, determine the winning sensor orientation, and direct the sensor array to the winning sensor orientation. The transaction control unit may also be responsible for collecting the offers of the winning bidders, and receiving the data from the sensors and transmitting it to the users. The transaction control unit 10 will be described as implemented in a general purpose computer as shown in FIG. 4. The computer will comprise a CPU 20 disposed in communication with memory (ROM 21 and RAM 22), a mass storage device 23, and the network through a network interface 24. The mass storage device 23 will store a bid database 25, transaction processor software 26, sensor array management software 27, web interface software 28, and operating system software 29. The same system could also be implemented by the use of a combination of computers as shown in FIG. 5.

A time unit must be selected to set forth the length of time during which the sensor array will satisfy the selected request. The seller of the sensor data can divide the use of the sensor array into time units of arbitrary length. For example, a sensor provider can decide to sell its sensor data in one hour blocks beginning and ending on the hour. The length of the time units can be altered based on the type of data being gathered by the sensor, and/or the amount of interest in the data. Accordingly, time units for something like a telescope, which might require long exposures, would be relatively lengthy. While, time units for checking traffic congestion would be relatively short.

Additionally, the transaction control unit, could be programmed to recognize unusually heavy and varied requests, and to respond to such a situation by shortening the time units for subsequent requests on that array. The increased number of time units will help to provide as many users as possible with the information they request. It will also increase the revenue that a sensor provider can obtain for a particularly popular or exciting event.

Figure 6:
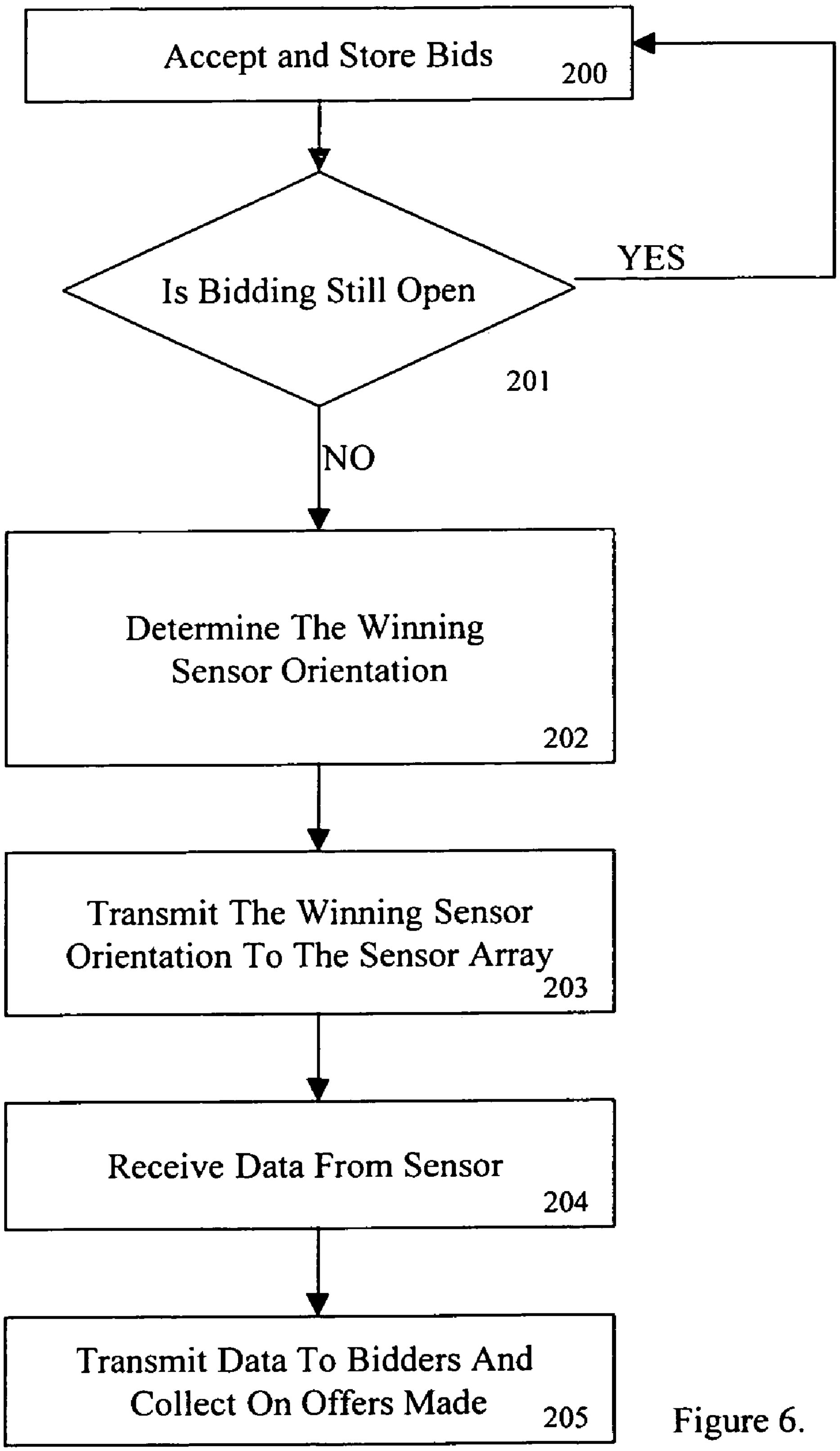
FIG. 6 is a flow chart demonstrating one embodiment of the logical operation of the system.

The operation of the transaction control unit 10, is described by the flow chart in FIG. 6. The transaction control unit 10, receives bids requesting a sensor orientation for a particular sensor array 13. The transaction control unit 10 will then store the bids in the bid database, step 200. The bid database, FIG. 7, includes the following fields, a personal identifier 1000, a sensor array identifier 1001, a requested sensor orientation 1002, an offer 1003, and a payment method 1004. Furthermore, additional fields could be added to allow users to designate alternate preferences, and offers, to be considered if their initial request is not chosen. If the bidding is still open, (i.e. there is still time before the transaction control unit must choose a winner and transmit the winning sensor orientation for the time unit) the transaction control unit will continue to receive and store bids, step 201.

When the bidding is closed the transaction control unit 10, then chooses the winning sensor orientation, step 202. It should be noted that these two steps could be reversed. In other words, the transaction control unit could determine the current winning sensor orientation after every bid is received and the selected sensor orientation would be the current winning orientation at the close of bidding.

The determination of the winning sensor orientation is made in accordance with the type of selection system picked by the sensor provider. The specific method of step 202, FIG. 6, will therefore vary based on the selection system chosen, three possible systems are described in FIGS. 8A-C. The most basic approach would be to set the winning sensor orientation to be the one chosen by the highest bidder, see FIG. 8.A. First, the bid database is accessed, step 300. Next, the stored bids are searched and the bid with the highest offer is found, step 301. Finally, the sensor orientation from the bid with the highest associated offer is set as the winning orientation, step 302. Under this system the sensor provider could also allow the winning bidder to make real time adjustments to the sensors during the winner's allotted time unit.

Another more complex approach would be to choose the winning sensor orientation in accordance with the sensor orientation chosen by the greatest number of bidders, see FIG. 8.B. First, the bid database is accessed, step 400. Next, the bids are sorted into groups containing bids with similar requested sensor orientations, step 401. Next, the number of bids in each group is counted and the group containing the most bids is identified, step 402. Finally, the winning sensor orientation is set based on the requested sensor orientations of the identified group, step 403. This system will allow the sensor provider to satisfy the greatest number of users, because the most popular sensor orientation is selected. Such an approach may be useful for marketing reasons. For example, maximizing the number of satisfied users in a given auction will help to assure that those users will enjoy the service and use it again in the future.

The previously described system could also be used to operate a free service. A free system would enable sensor providers who are not interested in charging directly for access to the sensor, to still choose sensor orientations that their users are most interested in. Obviously, under a free system users would not need to submit offers, and therefore user identification and payment methods would also not be required.

Yet another approach would be a profit maximizing approach, see FIG. 8.C. Here the transaction control unit would choose the sensor orientation with the highest aggregate offer value. First, the bid database is accessed, step 500. Next, the bids are sorted it groups containing bids with similar requested sensor orientations, step 501. Next, the total value of all the offers in each of the created groups is determined, step 502. This is accomplished by summing the offers associated with each of the bids in a given group. Next, the group with the highest total value is identified, step 503. Finally, the winning sensor orientation is set to an orientation compatible with the sensor orientations of the bids making up the identified group, step 504.

Figure 9:
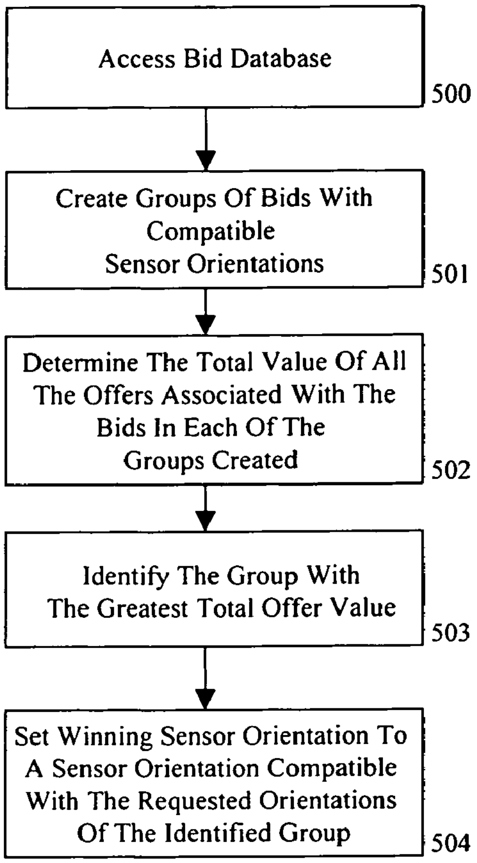
FIG. 9 is a chart demonstrating a sample auction under the return maximizing system.

The simplified example in FIG. 9 demonstrates the unique nature of this type of system. In this auction five bidders made requests and neither the highest bidder nor the most often selected choice won. Three bidders chose to point the sensor to the left (A, B, and D), and among them was the highest bidder (D). However, the winning orientation was right because the $11.00 aggregate value of C and E's offers, was greater than $10.00 aggregate value of A, B, and D's offers. It should be noted that no cooperation between C and E, or A, B, and D, was required. The individual bidders need only offer what they are willing to pay to point the sensor in a given direction. This system is very desirable because it maximizes the sensor provider's return for each individual auction.

The last two auction methods discussed, greatest number of bidders and profit maximizing, will benefit from the concept of compatible bids. This aspect of the system recognizes that some sensor orientation requests that are different could be satisfied by one sensor array at the same time. A sensor array with multiple sensors could have various compatible sensor orientations, depending on which individual sensors the users request. For example the sensor array in FIG. 2, could satisfy two different desired sensor requests if one user is only interested in data from the parabolic microphone 16, and another is only interested in data from the video camera 15. As long as users making the request want data from the same direction the requests would be compatible. Even if the requests are for data in opposite directions, (e.g., the camera pointed north and the microphone pointed south) the opposite orientations might still be compatible if the two sensors can move independently of one another on the sensor array.

Another, type of compatibility would result when sensor data gathered over a large field of view can be parsed to satisfy many users. A digital video camera might be used in this way. For example, if the camera is oriented with a wide field of view the sensor provider could satisfy numerous more narrow requests within that field. If users wanted to zoom-in to opposite sides of the camera's field, the camera could capture the whole field of view and then using computer imaging techniques provide the users with the requested magnified portions of the image. The only limit to providing this type of compatibility is the resolution of the camera, and the scope of the camera's widest field of view.

Sensor providers could also choose to define sensor orientations which are substantially similar to be compatible. Under this scheme if requested orientations were not completely compatible but could be substantially satisfied the bids would be considered compatible. For example a sensor provider might consider requested sensor orientations that overlap at least 90% as compatible. This may result in some users not receiving 10% of the information they requested. The sensor provider would set a degree of accuracy that would be appropriate for the data in question. For example, recreational use may not require a high degree of accuracy, while scientific use may require absolute accuracy. The sensor provider could also provide an option that allowed bidders to set the degree of accuracy they require, by requesting a range of desirable sensor orientations.

Once the winning sensor orientation is determined, the transaction control unit transmits the winning sensor orientation to the sensor array, step 203 FIG. 6. Then, the transaction control unit receives data from the sensor array, step 204. Finally, the transaction control unit forwards the sensor data to the bidders and collects on the winning offers, step 205. As noted above, this step is not required because the data could be transmitted directly from the sensor array to the users. Or, the sensor provider may elect to provide the sensors for free thereby avoiding the need to bill users. Furthermore the data can be transmitted to just the winners, or it can be broadcast on the web site used to access the sensors, thereby providing the data to anyone accessing the site.

It will be apparent to those skilled in the art that various modifications and variations can be made in the system and processes described herein without departing from the spirit or scope of the invention. Thus, it is intended that the present description cover all modifications and variations provided they come within the scope of the appended claims and their equivalents. In this context, equivalents means each and every implementation for carrying out the functions recited in the claims, even if not explicitly described herein.

While the best mode for carrying out the preferred embodiment has been illustrated and described in detail, those familiar with the art will recognize various alternative designs and embodiments which fall within the spirit of the system and method described herein. The appended claims are intended to cover all those changes and modifications falling within the true spirit and scope of the present system and method.

The invention claimed is:

1. A method for distributing sensor data comprising:

receiving with a computer a plurality of requests for orienting a sensor, each request being provided from a respective user as part of a bidding process and including a respective offer amount;

storing the requests;

selecting one of the requests based on at least one of the offer amounts; and transmitting a sensor orientation corresponding to the selected request.

2. The method of claim 1 wherein each of the requests also contains a respective payment method, further comprising using one of the payment methods to collect the respective offer amount.

3. The method of claim 2, wherein the selected request is selected by choosing a sensor orientation corresponding to a desired sensor orientation of the request having the highest offer amount.

4. The method of claim 2, wherein the selected request is selected by choosing a sensor orientation corresponding to a desired sensor orientation of a group of requests with the same desired sensor orientations, where the aggregate value of that group's offer amounts is greater than the aggregate value of the offer amounts of any other group of requests with the same desired sensor orientations.

5. The method of claim 2, wherein the selected request is selected by choosing a sensor orientation corresponding to a desired sensor orientation of a group of requests with compatible desired sensor orientations, where the aggregate value of that group's offer amounts is greater than the aggregate value of the offer amounts of any other group of requests with compatible desired sensor orientations.

6. The method of claim 5, wherein sensor orientations are compatible if they can be satisfied by an array of sensors at the same time.

7. The method of claim 5, wherein sensor orientations are compatible if they can be substantially satisfied by an array of sensors at the same time.

8. The method of claim 1, wherein a desired sensor orientation included in a request includes a range of sensor orientations.

9. The method of claim 8 wherein each of the requests also contains a respective payment method, further comprising using one of the payment methods to collect the respective offer amount.

10. The method of claim 9, wherein the selected request is selected by choosing a sensor orientation corresponding to a desired sensor orientation of a group of requests with compatible desired sensor orientations, where the aggregate value of that group's offer amounts is greater than the aggregate value of the offer amounts of any other group of requests with compatible desired sensor orientations.

11. The method of claim 10, wherein a selected sensor orientation is compatible with a desired sensor orientation if it is within the range of sensor orientations.

12. An apparatus for distributing sensor data comprising:

a network interface, coupled to a network;

a memory device including a database for storing information; and a processor disposed in communication with the memory device and the network interface, the processor configured to receive a plurality of requests for orienting a sensor from the network, each request being provided from a respective user as part of a bidding process and including a respective offer amount, the processor being further configured to store the requests in the database, select one of the requests based on at least one of the offer amounts, and transmit a sensor orientation corresponding to the selected request.

13. The apparatus of claim 12 wherein each of the requests also contains a respective payment method, with the processor further configured to use one of the payment methods to collect the respective offer amount.

14. The apparatus of claim 13, wherein the selected request is selected by choosing a sensor orientation corresponding to a desired sensor orientation of the request having the highest offer amount.

15. The apparatus of claim 13, wherein the selected request is selected by choosing a sensor orientation corresponding to a desired sensor orientation of a group of requests with the same desired sensor orientations, where the aggregate value of that group's offer amounts is greater than the aggregate value of the offer amounts of any other group of requests with the same desired sensor orientations.

16. The apparatus of claim 13, wherein the selected request is selected by choosing a sensor orientation corresponding to a desired sensor orientation of a group of requests with compatible desired sensor orientations, where the aggregate value of that group's offer amounts is greater than the aggregate value of the offer amounts of any other group of requests with compatible desired sensor orientations.

17. The apparatus of claim 16, wherein sensor orientations are compatible if they can be satisfied by an array of sensors at the same time.

18. The apparatus of claim 16, wherein sensor orientations are compatible if they can be substantially satisfied by an array of sensors at the same time.

19. The apparatus of claim 12, wherein a desired sensor orientation included in a request includes a range of sensor orientations.

20. The apparatus of claim 19 wherein each of the requests also contains a respective payment method, with the processor further configured to use one of the payment methods to collect the respective offer amount.

21. The apparatus of claim 20, wherein the selected request is selected by choosing a sensor orientation corresponding to a desired sensor orientation of a group of requests with compatible desired sensor orientations, where the aggregate value of that group's offer amounts is greater than the aggregate value of the offer amounts of any other group of requests with compatible desired sensor orientations.

22. The apparatus of claim 21, wherein a selected sensor orientation is compatible with a desired sensor orientation if it is within the range of sensor orientations.

23. A computer readable medium comprising:

instruction code for receiving requests for orienting a sensor, each request being provided from a respective user as part of a bidding process and including a respective offer amount;

instruction code for storing the requests;

instruction code for selecting one of the requests based on at least one of the offer amounts; and instruction code for transmitting a sensor orientation corresponding to the selected request.

24. The computer readable medium of claim 23, wherein each of the requests also contains a respective payment method, further comprising instruction code for using one of the payment methods to collect the respective offer amount.

25. The computer readable medium of claim 24, wherein the selected request is selected by choosing a sensor orientation corresponding to a desired sensor orientation of the request having the highest offer amount.

26. The computer readable medium of claim 24, wherein the selected request is selected by choosing a sensor orientation corresponding to a desired sensor orientation of a group of requests with the same desired sensor orientations, where the aggregate value of that group's offer amounts is greater than the aggregate value of the offer amounts of any other group of requests with the same desired sensor orientations.

27. The computer readable medium of claim 24, wherein the selected request is selected by choosing a sensor orientation corresponding to a desired sensor orientation of a group of requests with compatible desired sensor orientations, where the aggregate value of that group's offer amounts is greater than the aggregate value of the offer amounts of any other group of requests with compatible desired sensor orientations.

28. The computer readable medium of claim 27, wherein sensor orientations are compatible if they can be satisfied by an array of sensors at the same time.

29. The computer readable medium of claim 27, wherein sensor orientations are compatible if they can be substantially satisfied by an array of sensors at the same time.

30. The computer readable medium of claim 23, wherein a desired sensor orientation included in a request includes a range of sensor orientations.

31. The computer readable medium of claim 30 wherein each of the requests also contains a respective payment method, further comprising instruction code for using one of the payment methods to collect the respective offer amount.

32. The computer readable medium of claim 30, wherein the selected request is selected by choosing a sensor orientation corresponding to a desired sensor orientation of a group of requests with compatible desired sensor orientations, where the aggregate value of that group's offer amounts is greater than the aggregate value of the offer amounts of any other group of requests with compatible desired sensor orientations.

33. The computer readable medium of claim 32, wherein a selected sensor orientation is compatible with a desired sensor orientation if it is within the range of sensor orientations.

* * * * *